United States Patent
Korpi et al.

(10) Patent No.: US 6,621,814 B1
(45) Date of Patent: Sep. 16, 2003

(54) METHOD AND APPARATUS FOR TRANSMITTING VOICE DATA IN DATA PACKETS WITH ADDITIONAL SUPPLEMENTARY SERVICES

(75) Inventors: Markku Korpi, Starnberg (DE); Guy Coen, Aalst (BE); Harald Mueller, Gilching (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/415,376

(22) Filed: Oct. 8, 1999

(51) Int. Cl.[7] ................................................. H04J 15/00
(52) U.S. Cl. ...................................... 370/352; 370/466
(58) Field of Search ................................ 370/352, 466, 370/469

(56) References Cited

U.S. PATENT DOCUMENTS

| | | | | |
|---|---|---|---|---|
| 6,240,084 B1 | * | 5/2001 | Oran et al. ................. | 370/352 |
| 6,278,697 B1 | * | 8/2001 | Brody et al. ................ | 370/466 |
| 6,307,845 B1 | * | 10/2001 | Hummelgren et al. ...... | 370/469 |
| 6,414,953 B1 | * | 7/2002 | Lamarche et al. .......... | 370/466 |

FOREIGN PATENT DOCUMENTS

EP 0 966 145 A 12/1999

OTHER PUBLICATIONS

Korpi et al: "Supplementary Services in the H.323 IP Telephony Network", IEEE Comm. Magazine, vol. 37, No. 7, Jul. 1999, pp. 118–125, XP000835313.

ITU.T: "H.323 Visual Telephone Systems and Equipment for Local Area Networks Which Provide a non–guaranteed quality of Service", ITU–T Recommendations, Nov. 1996, XP002214364.

ITU–T: "H.450.1: Generic Functional Protocol for the Support of Supplementary Services in H.323", ITU–T Recommendations, Feb. 1998, XP002214365.

ITU–T: "Call Transfer Supplementary Services for H.323", ITU–T Recommendations, Feb. 1998, XP002152631.

* cited by examiner

*Primary Examiner*—Salvatore Cangialosi
(74) *Attorney, Agent, or Firm*—Bell, Boyd & Lloyd LLC (57) ABSTRACT

A method and apparatus for the transmission of voice data in data packets upon utilization of additional performance features in a terminal equipment, wherein switching equipment is employed for the through-connection of voice connections such that voice data is transmitted in voice channels and wherein switching equipment is also employed for the control of supplementary services.

11 Claims, 3 Drawing Sheets

METHOD AND APPARATUS FOR TRANSMITTING VOICE DATA IN DATA PACKETS WITH ADDITIONAL SUPPLEMENTARY SERVICES

BACKGROUND OF THE INVENTION

1. Field of the Invention

The present invention is directed to a method for transmitting voice data in data packets upon utilization of additional supplymentary service, wherein a terminal unit working in packet-based fashion transmits and receives voice data in data packets.

2. Description of the Prior Art

A data packet usually contains a plurality of data words with a predetermined plurality of bit places; for example, what are referred to as octettes having eight bit places. In general, octettes that belong to the data header can be distinguished in a data packet. For example, the destination of the data packet is indicated in the data of the data header. On the other hand, for example, data is also contained in the data header that determine the type of data packet. In addition to the data header, there are usually octettes that contain the payload information; for example, the voice data. Data words also are transmitted that form an end section of the data packet and contain, for example, a checksum for error recognition and error correction.

Standards for methods of transmitting voice data in data packets are prescribed, among other things, in the following ITU-T Recommendations (International Telecommunication Union-Telecommunication):

- H.323, "Packet based multimedia communications systems", 02/98;
- H.450.1, "Generic functional protocol for the support of supplementary services in H.323", Jan. 27, 1998;
- H.450.2, "Call transfer supplementary service for H.323", Jan. 27, 1998; and
- H.450.3, "Call diversion supplementary service for H.323", Jan. 27, 1998.

The basic concept for transmitting multimedia data in data packets is standardized in the Standard H.323. This basic concept, in particular, also applies to the transmission of voice data.

The Standard H.450.1 contains general definitions for the methods and signaling protocols for realizing additional supplymentary service in the connection between what are referred to as H.323 devices; i.e., devices that work according to the Standard H.323. The Standard H.405.1 thus forms the basis for the Standards H.450.2 and H.450.3 that are directed to individual supplymentary service.

The Standard H.450.2 contains definitions for the supplymentary service of "call transfer." Given the supplementary service "call transfer ," a calling A-subscriber first sets up a connection to a called B-subscriber. When the connection has been set up, the A-subscriber then calls a third C-subscriber and subsequently hangs up. After the A-subscriber has hung up, there is a connection between the B-subscriber and the C-subscriber.

The Standard H.450.3 contains definitions for the supplymentary service "call division." This supplementary service makes it possible for the call to be rerouted to some other terminal equipment before the setup of a connection.

According to the Standards H.450.2 and H.450.3, supplymentary service usually are made available in the terminal equipment themselves. The terminal equipment is therefore constructed in a complex way and has an extensive program system. A central instance for the supplementary service usually is not required.

Traditional voice terminal equipment transmits the voice data in data channels. In the simplest case, a voice channel is formed by a line that is used only for a single connection. Analog or digital voice data is exchanged via the line without interruption by information for connection control. Usually, however, the voice data belonging to different connections is transmitted on a line in the time-division multiplex method. A time section for the transmission of the voice data is defined for each connection within time frames that follow one another in time.

Given traditional ISDN terminal equipment (Integrated Services Digital Network) and, in particular, given system telephones at private branch exchanges (PBS), there are a multitude of other, additional supplementary service; for example:

- call waiting;
- charge display;
- three-party conference;
- hold for inquiry;
- negotiating;
- blocking outgoing calls;
- connection without dialing, what is referred to as baby call; and
- call back when busy.

It is to be anticipated that standards will be prescribed little by little by the ITU for these additional supplementary service-these containing definitions for using the supplementary service given a transmission of voice data in data packets. However, several years will pass before such standards are defined. After the publication of binding standards, these must be converted into programs for the drive of H.323 terminal equipment so that another development time will have to be provided. Only after this can the user of H.323 terminal equipment employ all additional supplementary service that are already standard for the voice transmission in a voice channel given ISDN terminal equipment and system telephones. There is also a similar situation given other methods for the transmission of voice data in data packets.

An object of the present invention, therefore, is to specify simple methods for transmitting voice data in data packets with additional performance features wherein additional supplementary service can be used without great standardization, development or, respectively, programming outlay for terminal units. Further, electronic units and programs should be specified that serve for the implementation of the methods.

SUMMARY OF THE INVENTION

Accordingly, the present invention considers the fact that additional supplementary service have been present for a long time in switching equipment for circuit switching of voice connections in a circuit-switched telecommunication network; for example, in a network wherein voice data is transmitted in voice channels, such as in telecommunication systems of Siemens AG. Since the supplementary service are centrally performed in the switching equipment, the terminal equipment to be connected to the switching equipment is constructed comparatively simply. For example, the desire to use a supplementary service is signaled to the switching equipment from a telephone. In response thereto, the supplementary service of the switching equipment is activated. The switching equipment likewise sends signals to the telephone given employment of the supplementary service with which, for example, signal tones are generated or numerical sequences are sent to the telephone.

The present invention is also based on the perception that it is possible, with respect to the additional supplementary service, to forego the realization of the supplementary service in the terminal equipment for the transmission of voice data in data packets as in the case of terminal equipment for the transmission of voice data in the voice channel to be directly connected to the switching equipment; i.e., without an interface unit for the conversion of transmission signals. Terminal equipment that works in packet-based fashion thus also can be simply constructed because only measures for signaling between terminal equipment and exchange equipment have to be implemented in the terminal equipment. By contrast, no measures that relate to the actual supplementary service need be implemented in the terminal equipment.

In the inventive method, the terminal unit working in packet-based fashion is connected to the switching equipment with the assistance of an interface unit. The interface unit converts transmission signals coming from the switching equipment into transmission signals for the terminal unit, and converts transmission signals coming from the terminal unit into transmission signals for the switching equipment. During use of the additional supplementary service in the switching equipment for controlling the terminal equipment working in packet-based fashion, method steps are implemented in the inventive method that are to be implemented in the use of the additional supplementary service in the switching equipment for controlling terminal equipment connectable to the switching equipment without an interface unit for protocol conversion for the transmission of voice data in a voice channel. The method steps implemented in the switching equipment are, thus, the same at the terminal equipment for the transmission of voice data in data packets and at terminal equipment for the transmission of voice data in a voice channel. The interface unit ultimately connects the terminal device for the transmission of voice data in data packets to the exchange as though it were terminal equipment for the transmission of voice data in a voice channel.

In the inventive method, the switching equipment controls the terminal equipment given utilization of the supplementary service.

Control denotes that method steps in the terminal equipment are triggered by method steps executed in the switching equipment. The control is effected such that a method step in the terminal equipment corresponds to each method step in the switching center. Control commands from the switching equipment, thus, must be forwarded to the terminal equipment.

In the inventive method, the known supplementary service can be used in a simple way because only a comparatively small program for signaling to the exchange and for the interpretation of the signaling coming from the exchange need be stored in the terminal equipment working in packet-oriented fashion. A program for effecting the supplementary service themselves is not required in the terminal equipment working in packet-oriented fashion. As a result of the inventive method, the known and already implemented supplementary service can be used for the transmission of voice data in a voice channel given a connection between terminal equipment working in packet-based fashion and terminal equipment directly connectable to the switching equipment. The supplementary service also can be utilized when two pieces of terminal equipment working in packet-based fashion respectively have a connection to switching equipment.

In one development of the inventive method, the additional performance feature is selected at the side of the terminal unit. For example, the user using the terminal unit working in packet-based fashion decides to initiate what is referred to as a three-party conference. The terminal unit signals the interface unit the selection according to a signaling protocol employing data packets for data transmission networks working in packet-based fashion. The interface unit forwards the received signaling data to the switching equipment according to a signaling protocol defined for the switching equipment. The signal protocol is, thus, modified in the interface unit. For example, the signaling protocols can be modified by an unambiguous imaging of the signaling data of the one signaling, protocol onto the signaling data of the other signaling protocol. The interface unit only sends signaling data to the switching equipment of the same type that terminal equipment connectable to the switching equipment without the interface unit for protocol modification generates for the transmission of voice data in a voice channel.

In another development of the inventive method, the additional supplementary service is selected at the side of the switching equipment. This occurs either by traditional terminal equipment connected to the switching equipment (for example, with a digital telephone for long distance traffic), or by terminal equipment for the transmission of voice data in data packets that is connected via a different interface unit. The switching equipment executes the supplementary service and, upon execution of the additional supplementary service, sends signals or, respectively, signaling data to the interface unit according to a signaling protocol defined for the switching equipment. These signals agree with signals that would be transmitted upon execution of the additional supplementary service for a traditional terminal device connectable without the interface unit.

The signaling protocol defined for the switching equipment is, for example, a matter of an internal company signaling protocol of the manufacturer of the switching equipment. For example, such a signaling protocol is employed for signaling between the telecommunication system HICOM of Siemens AG and terminal equipment of the OPTISET type. In the development of the inventive method, the interface unit is driven by the switching equipment like terminal equipment that transmits the voice data in a voice channel.

In the development of the inventive method, the interface unit forwards the received signals according to a signaling protocol employing data packets for data transmission networks that work packet-oriented. The interface unit, thus, also modifies the signaling protocol in the other direction; i.e., from the switching equipment to the terminal unit.

The signaling protocol for the switching equipment is usually what is referred to as a stimulus protocol wherein only simple instructions are sent to the terminal equipment, these effecting a signaling in the terminal equipment that is visible to the user; for example, the output of signal tones or the display of numerals on a numerical display. The terminal equipment, in turn, merely signals simple signals to the switching equipment given a stimulus protocol; for example, picking up the receiver or the actuation of a specific key. The packet-based signaling protocol for the terminal equipment, by contrast, is usually what is referred to as a functional protocol wherein signaling is carried out dependant on the internal switch status of the terminal equipment. The adaptation of stimulus protocol and functional protocol can be implemented in that, for example, the switch status of the terminal equipment or, respectively, the switch status of the switching equipment as well is simulated in the interface unit. This is possible because the sequence of switch statuses in the switching equipment as well as the sequence of switch statuses in the terminal equipment directly connectable to the switching equipment are known.

Given exchanges wherein a functional protocol is employed for control, the conversion into the signaling protocol employed between the interface unit and the terminal equipment can be implemented even more simply than given a stimulus protocol. Given a functional protocol, there is a specific command in the switching center for each function. Accordingly, the terminal equipment must generate such a command and transmit it to the interface unit. A separate conversion method then can be implemented in the interface unit for each command.

However, methods are also employed wherein a protocol adaptation is implemented with the assistance of what is referred to as tunneling. In tunneling, terminal equipment is employed that process commands coming from the switching center. These commands are embedded in the signaling unit into commands that are transmitted between the signaling unit and the terminal equipment in data packets. In the other direction, the terminal equipment generates commands for the switching center that, however, are likewise embedded into data packets. The data packets are unpacked in the signaling unit, and the commands are forwarded unmodified to the control of the switching center. The content of the command is thereby not modified. When the commands employed in the switching center change, then only programs that would have to be changed anyway in order to use the new commands need be modified in the switching center and in the terminal equipment. The programs in the interface unit, by contrast, need not be modified.

In another development of the method of the present invention, a signaling protocol working according to the ITU-T Standard H.323 is employed as signaling protocol for the terminal equipment. The standard allows an expansion by new signaling commands that are directed to the utilization of additional supplementary service or tunneling. When the signaling protocol defined for the switching equipment likewise works on the basis of data packets, as is in the case given modern switching equipment, then the structure of the signaling unit is simplified.

In a development of the inventive method, the voice data is transmitted from the terminal unit to the interface unit according to a transmission protocol for data packets. The interface unit unpacks the voice data and forwards the received voice data to the switching equipment according to a protocol defined for voice transmission in a voice channel. The interface thus implements a conversion of the transmission protocol for voice data transmitted from the terminal unit to the switching equipment.

In another development, a conversion of the transmission protocols also is implemented in the other direction. The switching equipment thereby sends voice signals to the interface unit according to a method for voice transmission in a voice channel. The interface unit forwards the received voice signals to the terminal unit according to a transmission protocol for packet-based transmission.

In one development, a protocol that corresponds to the ITU-T Standard H.323 is employed as transmission protocol for the voice data. The method for the transmission in the voice channel in one development is a time-division multiplex method; for example, a PCM method (pulse code multiplex).

In another development of the inventive method, the terminal unit is connected to the interface unit via a data transmission network wherein data is transmitted on the basis of data packets. At least one piece of terminal equipment with which voice data can be transmitted in the data transmission network is connected to the data transmission network. For example, the Internet or an Intranet wherein the Internet protocol IP/TCP (Internet Protocol/Transfer Control Protocol) is employed is used as data transmission network. As a result of these measures, terminal equipment can be connected to switching equipment in a simple way.

In another development, an access device connected to the data transmission network controls the access of the terminal equipment to the data transmission network. A conversion of the telephone number of the circuit-switched telecommunication network into an address of a piece of terminal equipment of the data transmission network or in the opposite direction is implemented in the access device. This conversion can be incorporated in a simple way in the access device because basic functions for such a conversion already must be present therein. The access device is also referred to as "gatekeeper" in English.

The present invention is also directed to a line/trunk group for the packet-oriented voice transmission with which the above-explained method or, respectively, the developments thereof can be implemented. The technical effects cited above, thus, also apply to the line/trunk group.

A further aspect of the present invention is directed to a switching equipment with the inventive assembly. By employing the assembly, the performance features present in the switching equipment are also accessible to a packet-based voice transmission.

A next aspect of the invention is directed to an apparatus that contains the inventive line/trunk group. The aforementioned technical effects thus likewise apply to the inventive switching equipment and to the inventive device.

The aforementioned object also is achieved by a method that is closely related to the first inventive method because similar steps are implemented; these, however, are related to the terminal equipment. In the second inventive method, a voice, transmission unit of the terminal equipment transmits voice data according to a packet-based transmission protocol. In addition to the basic functions for the transmission of voice signals, at least one additional supplementary service can be employed for the packet-oriented voice transmission in an operating interface. A signaling unit transmits signaling data according to a packet-based signaling protocol between a data transmission network for the transmission of data packets and the terminal equipment. Upon use of the additional supplementary service the voice transmission unit, the signaling unit is driven such that signaling commands are sent into the data transmission network that indicate that the additional supplementary service is to be used. Alternatively or additionally, the signals the signaling unit receives from the data transmission network are checked and, given reception of signals that indicate the utilization of the supplementary service, the voice transmission unit and/or the operating interface is driven such as required by the supplementary service. The aforementioned technical effects apply to the second inventive method because these effects also arise when only the terminal unit is considered that is suitable for the implementation of the first inventive method. The second inventive method is also utilized in the developments of the first inventive method.

The present invention is also directed to a unit and to a program that are employed for the packet-oriented voice transmission according to the second inventive method or, respectively, the developments thereof. The technical effects cited for the second inventive method are also valid for the apparatus and the program.

Additional features and advantages of the present invention are described in, and will be apparent from the Detailed Description of the Preferred Embodiments and the Drawing.

DETAILED DESCRIPTION OF THE PREFERRED EMBODIMENTS

Figure 1:
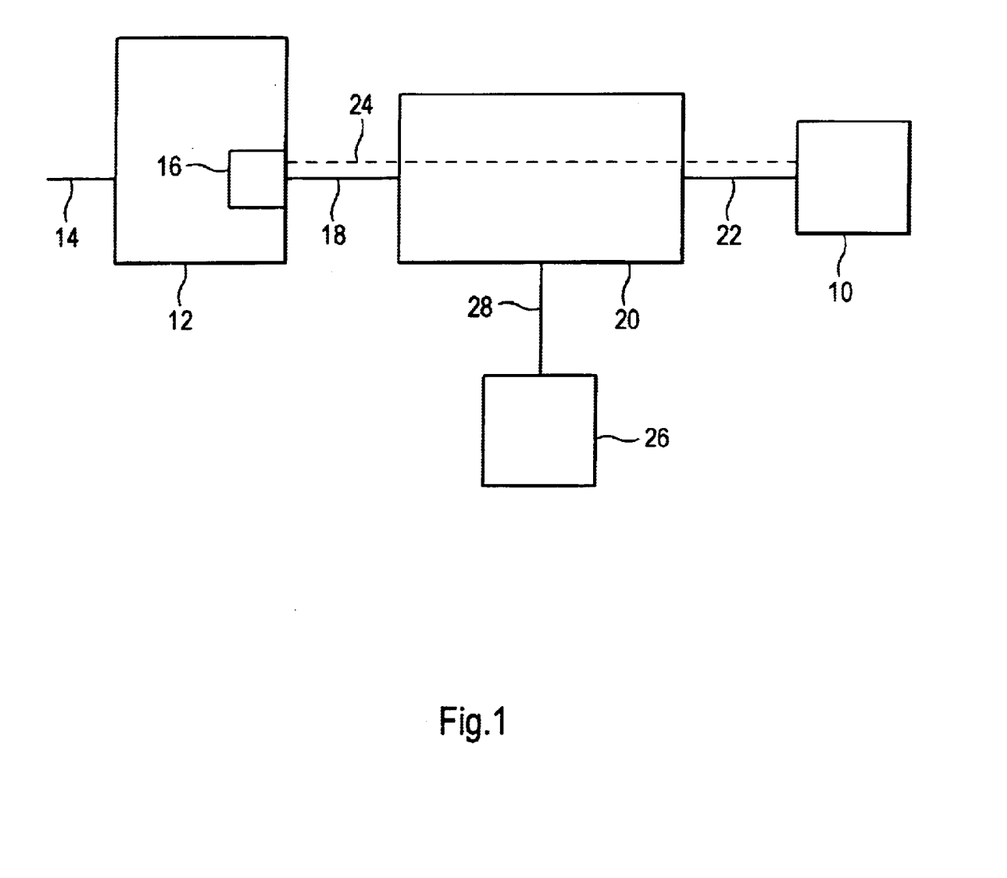
FIG. 1 shows the connection of terminal equipment working in packet-based fashion to a telecommunication system.

FIG. 1 shows the connection of a terminal equipment 10 working in packet-based fashion to a telecommunication system 12. The terminal equipment 10 works according to ITU-T Standard H.323 and employs the Internet protocol IP/TCP as transmission protocol. A unit (not shown in FIG. 1) of the terminal equipment 10 serves for voice input and for voice output. Voice data that is distributed onto data packets is generated in the terminal equipment 10 from the voice signals that are input. On the other hand, voice data contained in data packets received in the terminal equipment 10 is, in turn, converted into voice signals in the terminal equipment 10 and output.

The telecommunication system 12 is a circuit-switching telecommunication system. This means that connections of voice channels are permanently allocated for the duration of a call. The telecommunication system 12 is connected via exchange lines 14 to digital switching equipment in a public telephone network; for example, in the telephone network of TELEKOM AG. A line/trunk group 16 in the telecommunication system 12 enables the connection of the terminal equipment 10. The structure of the line/trunk group 16 is explained later with reference to FIG. 2. A line 18 that belongs to an Intranet 20 is connected to the line/trunk group 16. The Intranet 20 serves a private company for internal data transmission as well as for internal voice transmission.

The Intranet 20 also includes a line 22 to whose one end the terminal equipment 10 is connected. A connection 24 to the telecommunication system 12 thus can be set up from the terminal equipment 10 via the line 22, the Intranet 20 and the line 18.

FIG. 1 also shows terminal equipment 26 that is connected to the Intranet 20 with the assistance of a line 28. The terminal equipment 26 likewise functions according to Standard H.323.

Figure 2:
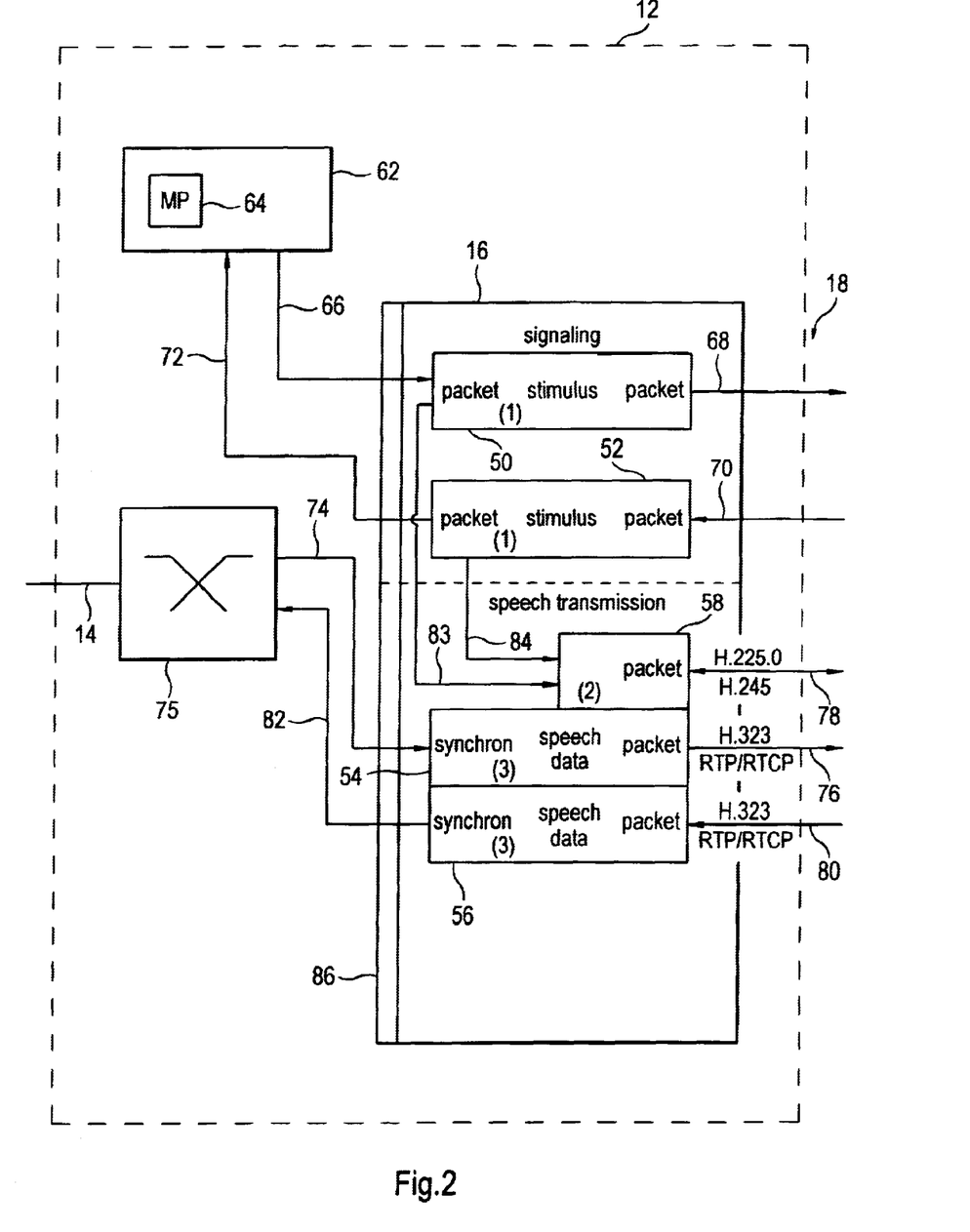
FIG. 2 shows the structure of a line/trunk group for the connection of the terminal equipment to the telecommunication system.

FIG. 2 shows the structure of the line/trunk group 16. The line/trunk group 16 is located in the telecommunication system 12 and contains four conversion units 50 through 56 whose function is explained below.

A signaling link 60 leads from a control unit 58 of the telecommunication system 12 to the conversion unit 50. The control unit 58 contains a microprocessor 62 that processes commands in a memory (not shown) of the telecommunication system 12 and thereby implements central jobs of the telecommunication system 12. Signaling data is thereby sent to the conversion unit 50 on the signaling link 60 according to a packet-based signaling protocol. The signaling protocol is the same protocol that is employed between the telecommunication system and the terminal equipment provided for this system. When, for example, a system of the type HICOM of Siemens AG is employed as telecommunication system 12, then terminal equipment suitable for this system is terminal equipment of the OPTISET type that transmits voice data in voice channels.

At its output side, the conversion unit 50 is connected to a signaling link 64 that lies between the conversion unit 50 and the terminal equipment 10. The conversion unit 50 converts the signals received via the signaling 60 according to the internal signaling protocol of the telecommunication system 12 into signals according to the signaling protocol defined in the Standard H.323 and sends these signals to the terminal equipment 10 via the signaling link 64.

The conversion unit 52 receives signaling data according to the Standard H.323 from the terminal equipment 10 via a signaling link 66. In the conversion unit 52, the received signals are converted into signals according to the internal signaling protocol of the telecommunication system 12. The converted signals are transmitted from the conversion unit 52 to the control unit 58 via a signaling link 68. The two transmission paths 60 and 68 can be formed with the assistance of a bidirectionally operating connection between control unit 58 and line/trunk group The conversion unit 54 serves for the conversion of voice signals into voice data. At its output side, the conversion unit 54 is connected via a transmission link 70 to a main switching network 72 of the telecommunication system 12. Among other things, on the other hand, the main switching network 72 is connected to the exchange line 14 so that, dependent on connections switched in the main switching network 72, voice signals proceed, for example, from the exchange line 14 via the transmission link 70 to the conversion unit 54. The transmission of the voice signals occurs according to PCM methods (pulse code modulation) and, thus, in channels according to a time-division multiplex method that is also referred to as TDM (time division multiplex). In the conversion unit 54, the voice signals transmitted synchronously in specific channels are converted into voice data and distributed onto data packets. The data packets are transmitted to the terminal equipment 10 via a transmission link 74 according to a transmission protocol defined in the Standard H.323. The transmission protocol RTP/RTCP (real time protocol/real time control protocol) is employed as transmission protocol.

The transmission links 64, 66, 74 and 76 are what are referred to as logical transmission paths on the line 18. On the basis of identifiers, the data packets transmitted on the line 18 are allocated to a transmission link 64, 66, 74 or 76.

At its input side, the conversion unit 56 receives voice data in data packets sent from the terminal equipment 10 on a transmission link 76. This voice data is, in turn, sent by the terminal equipment 10 according to the Standard H.323 and according to the protocols RTP/RTCP. The received voice data is converted into voice signals in the conversion unit 56, these voice signals being transmitted from the conversion unit 56 to the main switching network 72 in synchronous channels with the assistance of the PCM method via a transmission link 78. From the main switching network 72, for example, the voice signals are switched to the exchange line 14.

The transmission links 70 and 78 are, for example, two PCM channels that are transmitted via the same connecting line. The signaling links 64 and 66 as well as the transmission links 74 and 76 are formed by the line 18. An interface 80 corresponds to the interface to the telecommunication system 12 present at terminal equipment of the OPTISET type.

Upon conversion in the conversion units 50 and 52, a check is carried out to see whether a voice connection to the terminal equipment has to be set up or cleared down. When a voice connection must be setup, then the conversion unit 50 or, respectively, 52 makes a corresponding request of the conversion unit 54 and/or 56, which then setup the voice connection upon employment of the signaling protocol according to ITU Standard H.225 and H.245 (not shown).

The function of the packet-oriented voice transmission with additional supplementary service is explained below with reference to FIGS. 1 and 2. Additional supplementary service for the packet-based voice transmission are offered in the terminal equipment 10. When the user of the terminal equipment 10 selects one of these supplementary service, then a corresponding request is sent via the signaling link 66. The request is converted in the conversion unit 52 and forwarded to the control unit 68 via the signaling link 58. The control unit 58 initiates the activation of the supplementary service in the telecommunication system 12. Signals that thereby arise are signaled to the conversion unit 50 via the signaling link 60. The conversion unit 50 forwards the signals-following a protocol conversion-via the signaling link 64 to the terminal equipment 10. On the part of the control unit 58, the terminal equipment 10 is controlled like terminal equipment of the OPTISET type. Likewise, the conversion unit 52 only generates signals of a type also generated by terminal equipment of the OPTISET type.

Additional supplementary service of the telecommunication system 12 also can be used by the terminal equipment 26. To that end, the terminal equipment 26 likewise is connected to the telecommunication system 12 via the line/trunk group 16 or via a line/trunk group that is not shown which has the same structure as the line/trunk group 16. When supplementary service of the telecommunication system 12 are to be used in a voice transmission between the terminal equipment 10 and the terminal equipment 26, then the connection must be switched via the telecommunication system 12.

Figure 3:
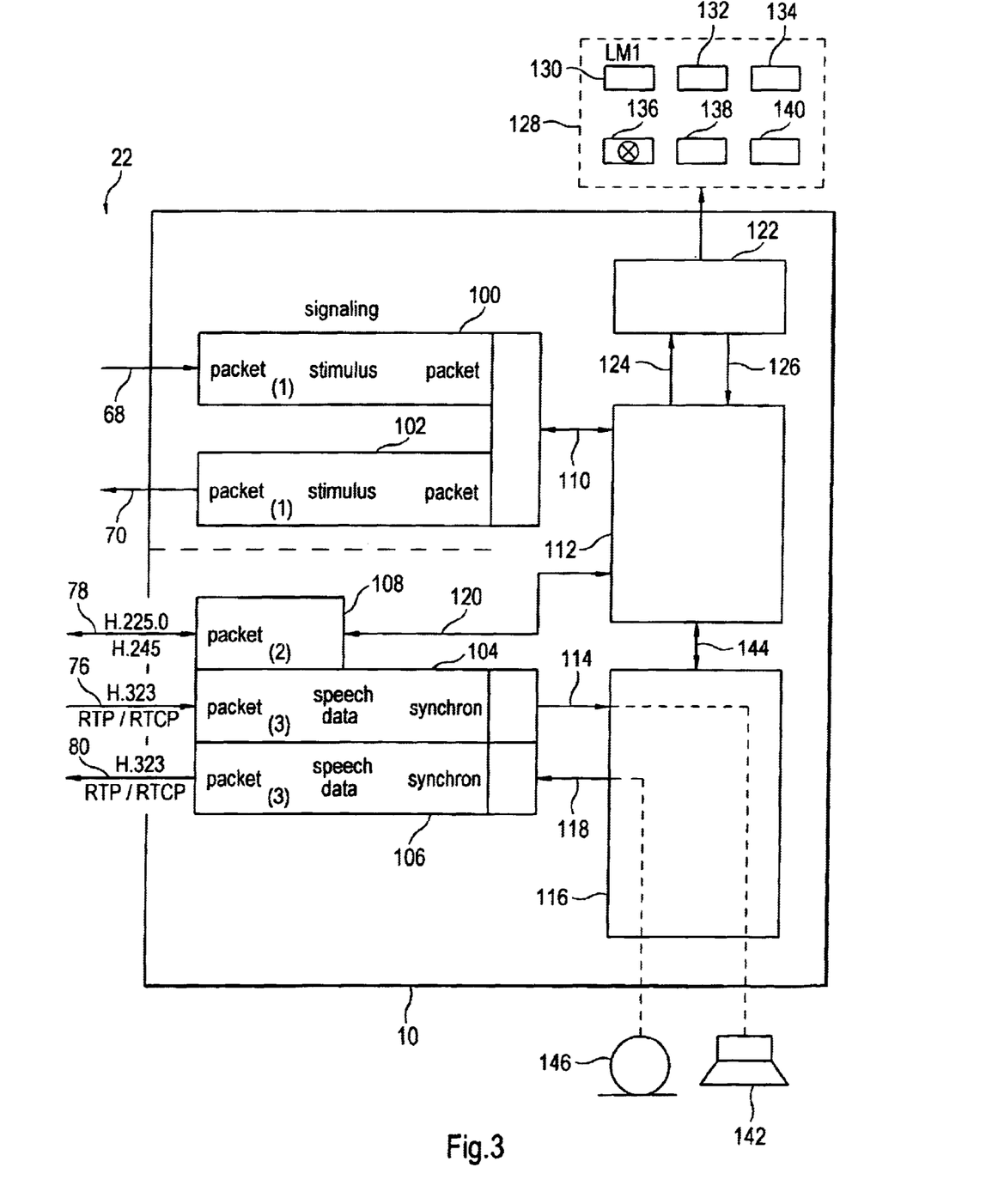
FIG. 3 shows the structure of terminal equipment for packet-based voice transmission in accordance with the teachings of the present invention.

FIG. 3 shows the structure of the terminal equipment 10. The line 22 is connected to a signaling and transmission unit 100 that receives and sends signaling data in data packets according to the ITU-T Standard H.323. The terminal equipment 10 contains a microphone 102 for the input of voice signals. For outputting voice signals, the terminal equipment 10 contains a loudspeaker 104. The microphone 102 and the loudspeaker 104 are connected to a voice transmission unit 106 that generates voice data from the signals occurring at the output of the microphone 102 and transmits these in data packets according to a transmission protocol corresponding to the ITU-T Standard H.323. To that end, the voice transmission unit 106 likewise is connected to the line 22. Voice data received via the line 22 is converted into electrical signals in the voice transmission unit for drive of the loudspeaker 104.

The signaling and transmission unit 100 collaborates with the voice transmission unit 106 in the setup and clear down of a voice connection. Signaling data for the setup or, respectively, clear down of the voice connection are sent to the other side on the line 22 according to ITU Standard H.225 and H.245.

There are control lines 107a and 107b between the signaling and transmission unit 100 and the voice transmission unit 106. Via the control line 107a, the voice transmission unit 106 is informed that a voice connection exists between terminal equipment 10 and line/trunk group 16. Moreover, which numbers the data packets with the voice data should have for identifying the connection is signaled to the voice transmission unit 106. Further messages for signaling on the control line 107a derive from the ITU-T Standard H.323 . The messages transmitted on the control line 107b also derive from Standard H.323.

A user interface 108 of the terminal equipment 10 contains programs which, when processed, allow additional supplementary service in the terminal equipment 10 to be used. The user interface 108 is connected to the signaling and transmission unit 100 or, respectively, to the voice transmission unit 106 via bidirectional control lines 109a or, respectively, 109b.

With the assistance of the user interface 108, operating elements with which the additional supplementary service can be used also are displayed on a monitor 110 connected to the terminal equipment 10. FIG. 3 shows three operating keys 112, 114 and 116 under which a display field 118, 119 and 120, respectively, is located.

The operating key 112 has the supplementary service LM1 "hold call" allocated to it. When this supplementary service is selected by an operator with the assistance of a computer mouse, then the display field 118 lying under the operating key 112 is shown in an illumination condition. The actuation of the operating key 112 is signaled from the user face 108 to the signaling and transmission unit 100 via the control line 109a. A command that contains a message that the operating key 112 has been pressed is generated in the signaling and transmission unit 100. As shown in FIG. 2, the signaling protocol according to the Standard H.323 is converted in the line/trunk group 16 into a signaling protocol according to the signaling protocol employed in the telecommunication system 12. The command "key pressed" is thereby unpacked from the data packets transmitted via the line 22 and is forwarded to the control unit 58 according to stimulus protocol.

The control unit 58 then parts a previously existing connection between a subscriber connected to the telecommunication system 12 and the user of the terminal equipment 10. The dial tone is supplied into the transmission link 70 for the user of the terminal equipment 10, so that it is ultimately audible via the loudspeaker 104. A melody that indicates a waiting condition is generated for the other subscriber. The control unit 58 also generates a stimulus for the display field 118 according to stimulus protocol. This stimulus is embedded into a data packet in the conversion unit 50 and is transmitted to the terminal equipment 10. The data packets received via the line 22 are searched in the signaling and transmission unit 100 for commands that relate to additional supplementary service. When such a command is found, then it is forwarded to the user interface 108 via the control line 109a. The command for switching the display field 118 on also is forwarded to the user interface 108. What is initiated in the user interface 108 is that the display field 118 is: shown in the illuminated condition on the monitor 110.

By employing the inventive method, the executive sequences in the terminal equipment are comparatively simple given use of the supplementary service. If one wished to decentrally use the supplementary service in the terminal equipment 10, i.e. without involvement of a telecommunication system 12, then most of the executive sequences would have to be implemented in the terminal equipment 10. Defined executive sequences would have to be programmed in the signaling and transmission unit 100 as well as in the voice transmission unit 106. For example, the signaling and transmission unit 100, when the operating key 112 is pressed, would have to indicate to the voice transmission unit 106 via the control line 107*a* that the voice paths to the remote subscriber are to be separated. The "held subscriber" would have to be informed by the signaling and transmission unit 100 according to Standard H.323 that he is in the held condition. The terminal equipment 10 itself also would have to initiate that the display field 118 is activated. The generation of a dial tone in the loudspeaker 104 would also have to be carried out by the terminal equipment 10.

Although the present invention has been described with reference to specific embodiments, those of skill in the art will recognize that changes may be made thereto without departing form the spirit and scope of the invention as set forth in the hereafter appended claims.

We claim as our invention:

1. A method of providing supplementary services in a telecommunications network, the method comprising the steps of:

providing switching equipment for circuit-switching voice connections in a telecommunications network;

forwarding at least one control command from the switching equipment to a terminal unit that has been given utilization of a supplementary service, the at least one control command for controlling the terminal unit that has been given utilization of the supplementary service;

connecting the switching equipment to a terminal unit for packet-based data transmission, via an interface unit;

converting transmission signals in interface unit coming from the switching equipment into transmission signals for the terminal unit, and transmission signals coming from the terminal unit into transmission signals for the switching equipment;

thereby embedding control commands coming from the switching equipment into control commands transmittable between the interface unit and the terminal unit for packet-based data transmission and unpacking data packets with control commands coming from the terminal unit for packet-based data transmission and forwarding the unpacked control commands to the switching equipment;

generating, in the terminal unit for packed-based data transmission, control commands for the switching equipment; and interpreting, in the terminal unit for packed-based data transmission, control commands coming from the switching equipment.

2. A method for transmitting voice data in data packets upon utilization of additional supplementary service as claimed in claim 1, further comprising the steps of:

selecting the additional supplementary service at the side of the terminal unit;

signaling, via the terminal unit, the interface unit to be selected according to a signaling protocol employing data packets; and forwarding, via the interface unit, the received signals according to a signaling protocol defined for the switching equipment.

3. A method for transmitting voice data in data packets upon utilization of additional supplementary service as claimed in claim 1, further comprising the steps of:

selecting the additional supplementary service at the side of the switching equipment;

executing the additional supplementary service;

sending signals, via the switching equipment, to the interface unit according to a signaling protocol defined for the switching equipment, the signals coinciding with the signals to be sent upon execution of the additional supplementary service to terminal equipment transmitting voice data in a voice channel; and forwarding, via the interface unit, the received signals according to a signaling protocol employing data packets.

4. A method for transmitting voice data in data packets upon utilization of additional supplementary service claimed in claim 2, wherein the signaling protocol employing data packets works according to ITU-T Standard H.323.

5. A method for transmitting voice data in data packets upon utilization of additional supplementary service as claimed in claim 3, wherein the signaling protocol defined for the switching equipment works on the basis of data packets.

6. A method for transmitting voice data in data packets upon utilization of additional supplementary service as claimed in claim 1, further comprising the steps of:

transmitting voice data from the terminal unit to the interface unit according to a transmission protocol for data packets;

unpacking, via the interface unit, the received voice data; and forwarding the received voice data to the switching equipment according to a TDM method for voice transmission in a voice channel.

7. A method for transmitting voice data in data packets upon utilization of additional supplementary service as claimed in claim 1, further comprising the steps of:

sending voice signals, via the switching equipment, to the interface unit according to a TDM method for voice transmission in a voice channel;

distributing, via the interface unit, the received voice signals onto data packets; and forwarding the received voice signals to the terminal unit according to a transmission protocol for data packets.

8. A method for transmitting voice data in data packets upon utilization of additional supplementary service as claimed in claim 6, wherein the transmission protocol corresponds to the ITU-T Standard H.323.

9. A method for transmitting voice data in data packets upon utilization of additional supplementary service as claimed in claim 7, wherein the TDM method for voice transmission in a voice channel is a time-division multiplex method.

10. A method for transmitting voice data in data packets upon utilization of additional supplementary service as claimed in claim 1, further comprising the steps of:

connecting the terminal unit to the interface unit via a data transmission network in which data is transmitted on the basis of data packets; and connecting a plurality of terminal equipment with which voice data can be transmitted to the data transmission network.

11. A method for transmitting voice data in data packets upon utilization of additional supplementary service as claimed in claim 10, further comprising the steps of:

controlling access, via an access means connected to the data transmission network, from the terminal equipment to the data transmission network; and converting at least one of the telephone number of a terminal unit of the telecommunication network into an address of a terminal unit in the data transmission network, and an address of a terminal unit in the data transmission network into the telephone number of a terminal unit of the telecommunication network.

* * * * *